Patented May 4, 1937

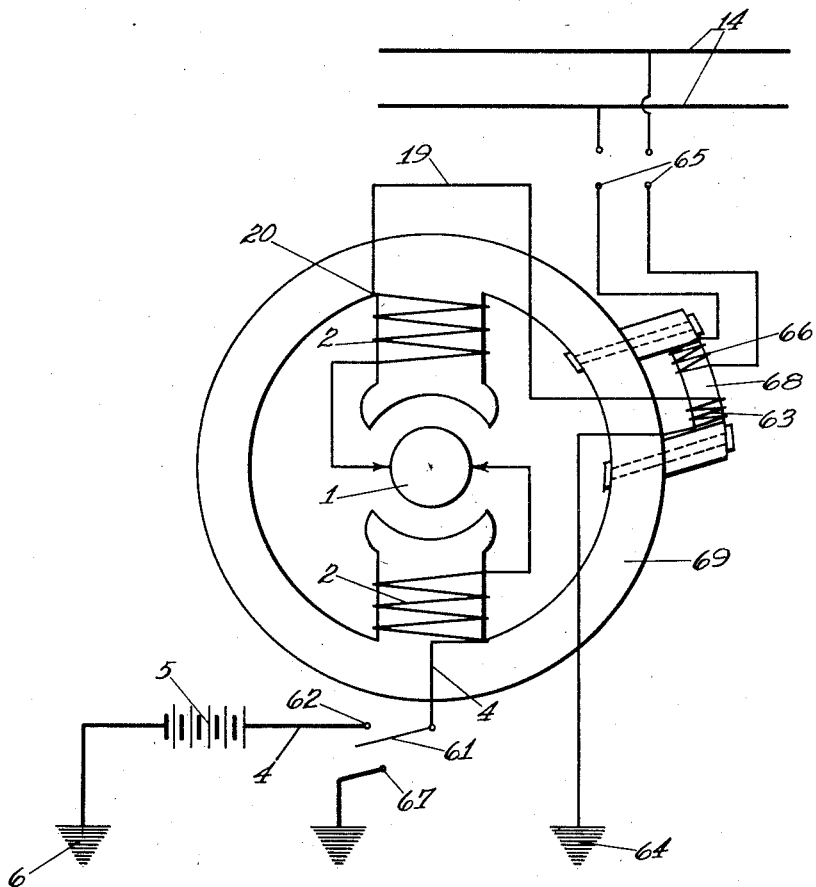

2,079,092

UNITED STATES PATENT OFFICE 2,079,092

METHOD AND APPARATUS FOR STARTING MOTORS

Charles B. Waters, deceased, late of Montclair, N. J., by Julia K. Waters, administratrix, Montclair, N. J., assignor, by direct and mesne assignments, of thirty-seven and one-half per cent to Leslie L. Steindler, Mamaroneck, N. Y., and twenty-five per cent to Messrs. Strauch & Hoffman, Washington, D. C., a partnership composed of William A. Strauch and James A. Hoffman Original application December 2, 1929, Serial No. 411,146. Divided and this application February 4, 1935, Serial No. 4,939

2 Claims. (Cl. 172—276)

This invention relates to the starting of internal combustion engines such as are used on automobiles, trucks, busses, rail cars, aeroplanes, boats and the like, where the present practice is to use a direct current motor and supply, said motor being supplied with current from a low voltage battery, generally a 6 to 12 volt battery, this application being a division of application Serial Number 411,146 filed December 2, 1929 and issued as Patent Number 1,989,958 on February 5, 1935. The usual direct current starting motor is series wound.

Several systems are employed for applying the torque developed by the electric motor to the internal combustion engine for starting the same. For instance, one of the usual systems employed is known as the Bendix drive, in which the electric motor has a screw on one end of its shaft, which when it turns, works a nut forward which moves a pinion in mesh with a gear on the flywheel of the internal combustion engine. When the engine starts, the flywheel then becomes the power source and revolves the pinion which is then forced back on the screw, thus disengaging the pinion from the engine flywheel. In another system, no screw is used, but the operator presses on a lever which positively forces engagement of the pinion with the flywheel, and subsequently throws the battery current on the electric motor which thus revolves the engine. When the operator takes his foot off the pedal, the pinion is at once thrown out of mesh with the flywheel and the battery is disconnected from the electric motor.

At times, particularly in winter, the electric battery has its electric energy used up faster than the energy is replaced by the generator usually associated with the internal combustion engine of an automobile, due to more night driving, congealing of lubricant, harder starting due to lowered battery voltage and weakened spark, and like conditions. The battery thus becomes low and does not have sufficient power to cause the electric motor to turn the internal combustion engine at sufficient speed to start the same while the spark becomes weak. When this condition occurs, the usual automobile operator attempts to start the internal combustion engine by hand, but such starting is dangerous particularly when the engine is cold and the spark is weak as there is a tendency to backfire, giving an impulse in the reverse direction.

One object of this invention, therefore, is to provide an auxiliary source of power which may be connected with the usual direct current starting motor, to start an internal combustion engine when the battery usually used for starting is low. More specifically, it is an object of this invention to provide means whereby the usual alternating current source of power, as found in the usual lighting circuit of a residence garage or commercial garage may be utilized as a source of power to start the internal combustion engine.

Another object of this invention is to provide a novel transformer, the primary winding of which may be connected to the usual alternating current power lines, and the secondary of which may be serially connected with the direct current starting motor of an internal combustion engine to start said engine.

Another object of this invention is to provide the usual direct current motor with means for temporarily utilizing a commercial source of alternating current to start an internal combustion engine.

It is a further object of this invention to provide a novel direct current series wound motor for starting the internal combustion engine, which motor has an auxiliary winding thereon which may be connected to a source of alternating current to function as the primary of the transformer, the usual direct current winding of the motor functioning in conjunction with an auxiliary series connected winding as the secondary of said transformer, whereby the motor may be started directly from an alternating current source.

Another object of this invention is to provide a specially wound direct current motor, for starting the internal combustion engines, in which motor a transformer is unitarily built, at least a portion of the bore of the transformer being provided by the iron of the usual motor field, whereby the motor may be operated by the usual source of direct current such as the battery, or by being connected to a source of alternating current, for starting the internal combustion engine associated therewith.

Another object of the present invention is to provide a starting motor for internal combustion engines which has the usual series motor for connection to a battery, said motor having a laminated core transformer bolted to the iron of the field of the motor, said transformer being adapted for connection to a source of alternating current in the primary thereof, and having the secondary thereof arranged in series with the motor whereby said motor may be started from the usual battery or from the source of alternating current.

It would appear at first glance that the usual direct current series motor with a solid iron magnetic field will not operate when alternating current is supplied thereto, especially a motor of the size necessary and the type used to start an internal combustion engine. Eddy currents in the solid iron magnetic circuit occur, which produce heating and tend to lessen the magnetic flux produced by the impressed current. However, applicant has discovered a peculiar and fortunate chain of technical circumstances which permit the successful operation of said starting motor by alternating current. These circumstances are as follows: First, the voltage of the motor is generally low, being six to twelve volts, and the voltage between adjacent commutator bars is therefore low. Second, the armature inductors are usually solid heavy copper bars, generally without cotton insulation between them, since they are enameled to provide the necessary insulation. Third, the voltage between the armature conductors to ground is low. Fourth, the number of teeth ratio between the flywheel and the starting motor pinion is very high so that a comparatively small torque in the starting motor is sufficient to start the internal combustion engine. High speed of rotation of the internal combustion engine is not absolutely necessary, provided the starting torque is sufficient to overcome the inertia and friction of the internal combustion engine. Fifth, since the torque is approximately a product of a constant times armature current, times field current, the actual power necessary from an alternating current source is relatively small, as although the amperage is high, the voltage is comparatively low, usually from six to twelve volts. Thus it is possible to use usual lighting circuits of small capacity to supply the necessary energy. Sixth, the time necessary for use is relatively short, since ordinarily the engine will start after only a few revolutions. Seventh, the transformer necessary to step down the usual alternating current to the proper voltage may be comparatively small so that the cost thereof will not be prohibitive.

All of the above circumstances contribute to make this invention feasible and practical in spite of the accepted idea of those skilled in the electrical arts and established theories that the method of starting discovered is inoperative. Because of the fact that the invention is opposed to the accepted theories of those skilled in the art, prior to the filing of this application extensive tests were made and the practicability of the invention was thoroughly demonstrated.

It is understood that the invention is not limited to the specific structure shown, since various other forms of apparatus and arrangements of the circuits may be embodied within the scope of the invention.

Referring to the drawing:

The figure of the drawing is a diagrammatic showing of an engine starting motor illustrating a preferred form of the invention whereby the motor is operable on alternating current or direct current and in which the transformer is mechanically and magnetically connected to the iron core of the motor.

Referring to the drawing, the usual starting motor armature 1 has the series field windings 2 connected therewith, one of said field windings grounded as at 64, the other field winding being connected by conduits 4 to the usual starting battery 5, which is grounded to the chassis at 6, the conductor 4 having interposed therein a starting switch 61. When the starting switch 61 is connected to contact 62, current from the battery passes through the series motor to rotate the same, thus turning the shaft 8 of said motor to advance the pinion thereon, into engagement with the flywheel connected with the crank shaft of the internal combustion engine in the usual manner.

In order to start the internal combustion engine, when the battery 5 is discharged, the invention contemplates the use of alternating current in the series motor for rotating the same and starting the engine. The alternating current lines 14 are connected to the primary 66 of a transformer, said connection, if desired, including a fuse. The secondary 63 of said transformer is grounded to the chassis at one side as at 64 and is connected by wire 19 to one terminal 20 of the series motor.

If the battery is discharged and will not start the internal combustion engine, some other source of power must be supplied to turn the engine over. Usually the private automotive owner starts his automobile in his own garage, wherein there is ordinarily a light socket connected to the house current, said house current being usually one hundred ten volts, alternating current. If the automobile is stored in a commercial garage, the power lines are readily available and in the case of commercial busses, trucks or rail cars, also the same sources of power are available. However, in the past it has been considered impossible to use the alternating current source of power to start the internal combustion engine by means of the direct current motor which usually starts them. Contrary to this usual belief, applicant has found that the motors can and do start the internal combustion engines by alternating current. To this end the power lines 14 and the transformer of the present invention are used.

The size of the necessary transformer is small and is therefore light in weight and is designed for inclusion in the circuit of the series wound direct current motor.

The primary and secondary windings of the transformer are so designed that the secondary will deliver alternating current at from 6 to 20 volts. The lead 19 of the transformer is usually made as short as possible since the current consumption is rather heavy, sometimes running from 200 to 600 amperes. However, the actual power drawn from the alternating current lines 14 is not excessive, since the voltage is materially reduced and therefore the usual lighting circuit wires are sufficient to carry the current.

As a general rule, an internal combustion engine will start after a comparatively small number of revolutions. It is therefore desirable to associate with the transformer, a time element fuse or cut-out which will open the circuit after a set interval of time, such as one minute to thus prevent damage to the starting motor if the circuit is inadvertently left closed for an excessive time. Such a fuse is not shown in the drawing since its construction and connections are well known and form no part of the present invention.

The above charging circuit may be permanently built into the vehicle and the transformer may also be permanently mounted on the vehicle, with means such as a plug 65, being used to connect the transformer to the wires 14.

In the embodiment shown in the drawing, the transformer is mounted on the exterior of the motor frame and is mechanically and magnetically connected to the field of said motor. The movable switch 61 is connected to contact 62 when the battery 5 starts the engine, the circuit then passing through the series field 2, armature 1, and secondary 63 of the transformer to ground as at 64. When the alternating current source of power is used to start, plug contacts 65 are engaged with the alternating current lines 14, the primary 66 of the transformer inducing current in the secondary 63 thereof, switch 61 being connected to the contact 67 and thus to ground. The core of the transformer is provided by the portion 68 which is preferably laminated and is mechanically and magnetically connected to the frame 69 which is in the field of the motor. The primary and secondary are designed to deliver approximately 6 to 20 volts in the secondary thereof.

It will be obvious to those skilled in the art that the various other types of transformers may be directly incorporated into the starting motor, to deliver the proper voltage and current to the motor when the primary of the transformer is connected to an alternating current source.

The above embodiment is shown for purposes of illustration only, and is not to be construed as a limitation since various other arrangements fall within the scope of this invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to secure by United States Letters Patent is:

1. A direct current motor for starting internal combustion engines having iron pole pieces and an iron core connecting the same, a series field wound on said pole pieces, an alternating current transformer having a primary winding and a secondary winding, a core for said primary and secondary windings comprising a portion of said motor core and means connecting said series field and the secondary of said transformer.

2. The invention as defined in claim 1 wherein said transformer has a laminated core mechanically and magnetically connected to said iron core.

JULIA K. WATERS,
*Administratrix of the Estate of Charles B. Waters, Deceased.*